United States Patent
Lee

(10) Patent No.: US 6,700,408 B2
(45) Date of Patent: Mar. 2, 2004

(54) DATA TRANSMISSION CIRCUIT FOR UNIVERSAL SERIAL BUS

(75) Inventor: Hak-Min Lee, Sungnam (KR)

(73) Assignee: Samsung Electronics Co., Ltd. (KR)

( * ) Notice: Subject to any disclaimer, the term of this patent is extended or adjusted under 35 U.S.C. 154(b) by 130 days.

(21) Appl. No.: 10/112,137

(22) Filed: Mar. 29, 2002

(65) Prior Publication Data

US 2002/0190755 A1 Dec. 19, 2002

(30) Foreign Application Priority Data

Jun. 16, 2001 (KR) .................................. 2001-34183

(51) Int. Cl.[7] .................................................. H03K 19/094
(52) U.S. Cl. ..................................................... 326/86
(58) Field of Search ............................ 326/16, 21, 22, 326/26, 27, 28, 30, 82, 86, 90, 93

(56) References Cited

U.S. PATENT DOCUMENTS

| | | | |
|---|---|---|---|
| 5,424,657 A | * | 6/1995 | Van Brunt et al. ............ 326/63 |
| 5,725,588 A | * | 3/1998 | Fiedler ......................... 326/63 |
| 5,912,569 A | | 6/1999 | Alleven ....................... 327/108 |
| 6,237,107 B1 | | 5/2001 | Williams et al. ............. 713/503 |

FOREIGN PATENT DOCUMENTS

| | | | |
|---|---|---|---|
| JP | 10-303715 | 11/1998 | .......... H03K/5/151 |
| KR | 2001-0027765 | 4/2001 | .......... H04L/29/04 |

* cited by examiner

*Primary Examiner*—Anh Tran
(74) *Attorney, Agent, or Firm*—Mills & Onello LLP

(57) ABSTRACT

The data transmission circuit has a test mode for offsetting variation of crossover voltages of the first and second data signals, which rises from threshold voltage distribution of plural transistors embedded in a transceiver. The transceiver converts an external test clock signal into the first and second data signals to be transferred to the first and second data lines, setting the first and second data signals with predetermined delay times. The delay times of the first and second data signals are adjusted when those crossover voltages deviate from a predetermined range, so that the crossover voltages of bus-specific data signals generated from the USB low-speed transceiver are always positioned within a normal range.

27 Claims, 5 Drawing Sheets

DATA TRANSMISSION CIRCUIT FOR UNIVERSAL SERIAL BUS

This application relies for priority upon Korean Patent Application No. 2001-34183, filed on Jun. 16, 2001, the contents of which are herein incorporated by reference in their entirety.

FIELD OF THE INVENTION

The present invention generally relates to universal serial bus systems, and more specifically to a data transmission circuit having low-speed output drivers to control crossover voltages in universal serial bus systems.

BACKGROUND OF THE INVENTION

In accordance with the latest developments of functions in computer processors and application programs, it has become necessary to efficiently expand the connection capacity of computers for various kinds of peripheral devices. Conventional external ports of computer systems have already come up to limits of certain peripheral devices with various functions and interface forms. For those demands, a new bus interface system, referred to as the "universal serial bus" (hereinafter, referred to as "USB"), has been developed by major computer and telephone networks companies, such as Intel, Microsoft, Compaq, NEC, and so on, in order to provide practical applications adaptable to various interfacing needs. The USB now has become a new standard for interfacing between computers and peripheral devices. The USB standard V1.0 was first defined on Jan. 15, 1996, and was revised as USB V1.1 on Jul. 28, 1998.

The USB device can be assigned to a multiplicity of peripheral devices in number of, for example, 127. One peripheral device includes 16 end points. Accordingly, it is possible to grant 16 functions at maximum in one peripheral device. There can be various peripheral devices connectable to USB devices, such as telephones, MODEMs, printers, scanners, game pads, microphones, digital speakers, styluses, joysticks, mice, monitors, or digital cameras.

Interface cables connecting a host computer to a peripheral device, or connecting between peripheral devices, are composed of a power source voltage (VDD) line, a ground voltage line (VSS), and a pair of data signal lines (D+, D−). The data signals must be leveled in the CMOS voltage range of 3.3V, as an example.

The USB V1.1 also defines optional speed modes of high-speed and low-speed. The high-speed mode is operable at 12 Mbps (mega bits per second) while the low-speed mode is operable at 1.4 Mbps. In the low-speed mode, since bus occupation rate becomes eight times that of the high-speed mode, it badly affects data transmission conditions for high frequency devices when too many devices are connected or short cycles are dominant in processing data. Therefore, the low-speed mode is adaptable to devices in need of low cost and low power consumption, or to devices with smaller amounts of data transmission, such as a mouse or a keyboard.

The pair of data signals (D+, D−) is a complementary pair in which one is at a high level when the other is at a low level. The data signal is designed to rise up to a high level or to fall down to a low level, with a predetermined slope. According to the USB standard, a crossover voltage, i.e., a voltage point where one data signal slope rising to a high level from a low level meets the other data signal slope falling to a low level from a high level, should be within the range of between 1.3V and 2.0V. FIG. 1A shows an ideal case where a crossover voltage of the data signals complies with the range defined in the USB standard while, FIG. 1B illustrates an abnormal case where a crossover voltage of the digital signals does not comply with the USB standard range.

Transmission data in the form of NRZI (Non-Return-to-Zero-Invert) are converted into bus-specific data signals (D+, D−), which are modulated by a transceiver to be adaptable to USB cables. A crossover voltage of the bus-specific data signals is sensitive to the threshold voltages of transistors used in the transceiver. For instance, assuming that a distribution profile of threshold voltages is 0.9V±0.1V, the threshold voltages ranges from 0.8V at minimum to 1.0V at maximum. As a result, there occur differences between a rising time and a falling time, which causes variation of crossover voltage of the bus-specific data signals.

SUMMARY OF THE INVENTION

It is, therefore, an object of the present invention to provide a data transmission circuit having a USB low-speed transceiver capable of regulating a crossover voltage of bus-specific data signals to be in a normal range by offsetting variations arising from manufacturing processes.

The data transmission circuit has a test mode for offsetting variation of crossover voltages of the first and second data signals, which rises from threshold voltage distribution of plural transistors embedded in a transceiver. The transceiver converts an external test clock signal into the first and second data signals to be transferred to the first and second data lines, making the first and second data signals be set with predetermined delay times. The delay times of the first and second data signals are adjusted when those crossover voltages deviate from a predetermined range, so that the crossover voltages of bus-specific data signals generated from the USB low-speed transceiver are always positioned within a normal range.

According to an aspect of the present invention, there is provided a data transmission circuit for transferring first and second data signals onto first and second data lines, respectively. The circuit includes a selection circuit for outputting an external data input signal in a normal mode while outputting an external test clock signal, an output circuit for converting an output signal from the selection circuit into the first and second data signals with predetermined delay times, and a comparison circuit for checking whether or not a crossover voltage of the data signals is positioned within a predetermined range. The data signals are adjusted with delay times when the crossover voltage deviates from the predetermined range.

In one embodiment, the comparison circuit includes a first circuit, e.g., comparator, for checking a first time point at which the first data signal reaches a reference voltage; a second circuit, e.g., comparator, for checking a second time point at which the second data signal reaches the reference voltage; and a third, e.g., logic, circuit for checking whether the first and second time points match with each other, such as, for example, by using an exclusive OR operation.

The data transmission circuit can also include a counter for counting a maintenance time of an active period of an output signal generated from the logic circuit. The delay times of the data signals can increase in accordance with counting values provided from the counter.

In one embodiment, the data transmission circuit is employed in an electronic device adaptable to USB standard V1.1, and the data lines are applicable to a USB interface. The reference voltage is from 1.3V to 2.0V.

In another aspect of the invention, a data transmission circuit transferring first and second data signals onto first and second data lines, respectively, includes a first selection circuit for outputting an external data input signal in a normal mode while outputting an external test clock signal; a second selection circuit for outputting a complementary signal of the external data input signal in a normal mode while outputting a complementary signal of the external test clock signal; a first delay circuit for delaying an output signal of the first selection circuit by a predetermined time; a second delay circuit for delaying an output signal of the second selection circuit by a predetermined time; a first output circuit for converting an output signal of the first delay circuit to the first data signal to be transferred into the first data line; a second output circuit for converting an output signal of the second delay circuit to the second data signals to be transferred into the second data line; and a comparison circuit for checking whether a crossover voltage of the data signals is positioned within a predetermined range during the test mode. The data signals are adjusted with delay times when the crossover voltage deviates from the predetermined range.

In still another aspect of the invention, a data transmission circuit is included in a serial interface device used in conducting interface operations between a serial data bus of a digital data processing system and function devices offering additional functions to the system. The serial interface device includes a controller for converting a data signal from the function device into an interface-specific data signal and for generating plural control signals. A data transmission circuit transfers first and second data signals onto first and second data lines, respectively. The circuit includes a selection circuit for outputting an external data input signal in a normal mode while outputting an external test clock signal; an output circuit for converting an output signal from the selection circuit into the first and second data signals with predetermined delay times; and a comparison circuit for checking whether a crossover voltage of the data signals is positioned within a predetermined range. The data signals are adjusted with delay times when the crossover voltage deviates from the predetermined range.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENT

Preferred embodiments of the invention will be described with reference to FIGS. 2 through 5.

Figure 1A:
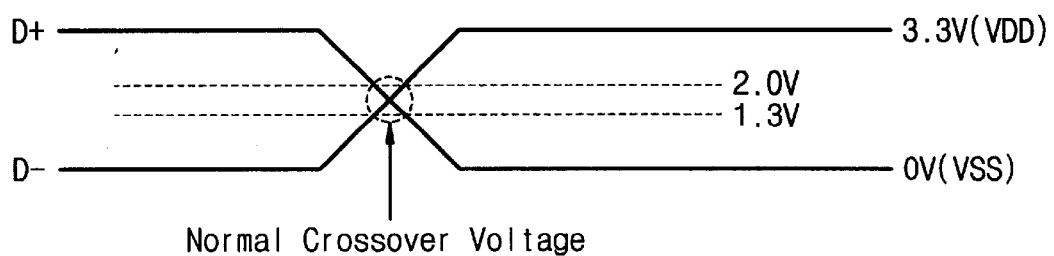
FIGS. 1A and 1B illustrate voltage waveforms of data signals generated from a USB interface system.
Figure 1B:
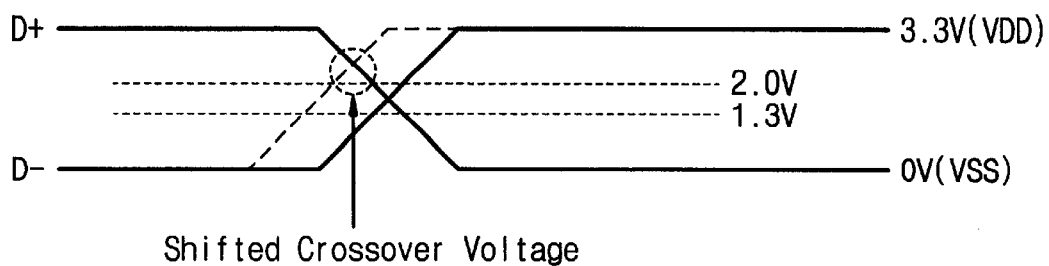
Figure 2:
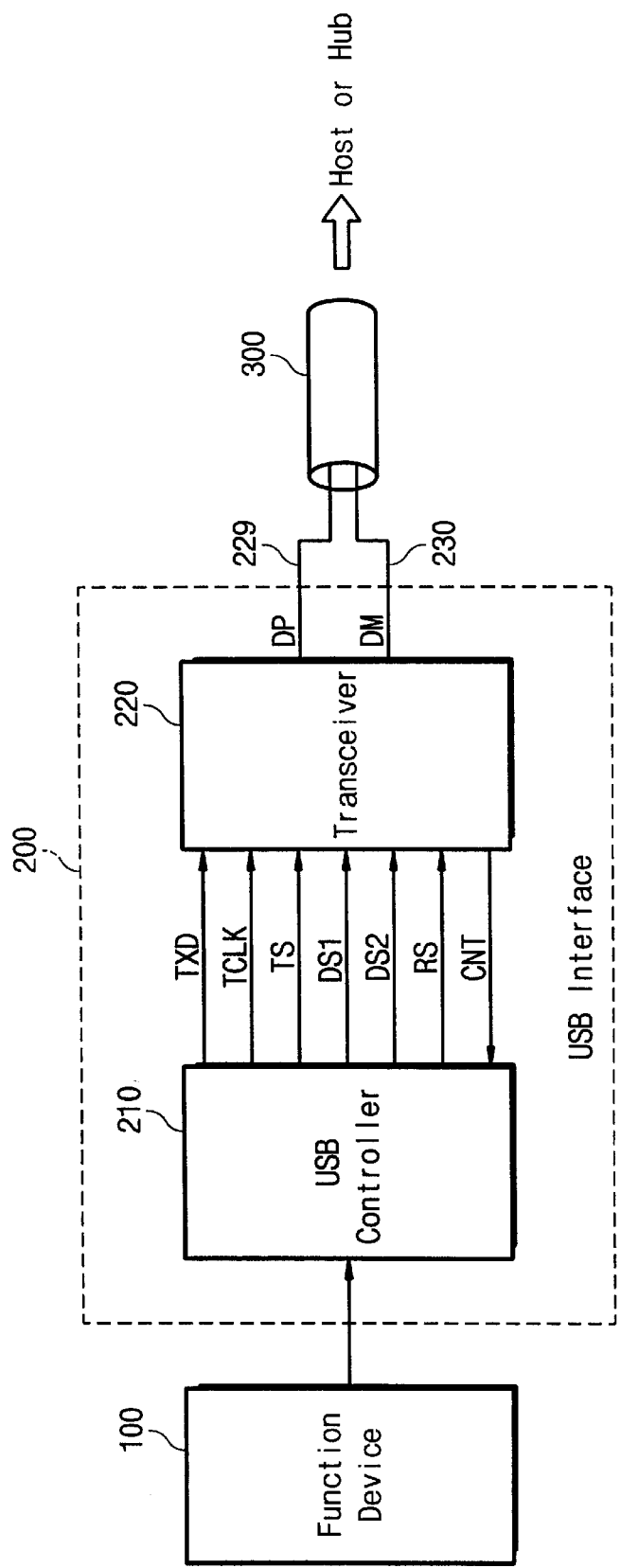
FIG. 2 illustrates a schematic structure of a USB interface system according to a preferred embodiment of the invention.

FIG. 2 illustrates a configuration of a USB interface system 200 connected between a function device 100 and a USB cable 300. The USB interface system 200 connects the function device 100 to a USB host or a hub through the USB cable 300. The USB interface system 200 includes a USB controller 210 and a low-speed USB transceiver 220. The USB controller 210 converts a data signal provided from the function device 100 into an encoded transmission data signal TXD (hereinafter, referred to "interface-specific data signal"). The USB controller 210 applies the interface-specific data signal TXD and plural control signals TCLK, TS, DS1, DS2, and RS, which activate data transmission and adjust a crossover voltage, to the transceiver 220. TCLK, TS, DS1, DS2, and RS are a transmission clock signal, a test mode selection signal, the first delay selection signal, the second delay selection signal, and a reset signal, respectively. The interface-specific data signal TXD generated from the USB controller 210 is formed in the encoded fashion of NRZI (Non-Return-to-Zero-Invert) in accordance with USB protocol. The transceiver 220 acts as a transmission output buffer associated with a pair of data lines 229 and 230 which are connected to the host of the hub through the USB cable 300. The transceiver 220 converts the interface-specific data signal TXD into encoded data signals (hereinafter, referred to "bus-specific data signals") DP and DM that are modulated into a bus-specific form. The transceiver 220 regulates a crossover voltage of the bus-specific data signals in response to the control signals TCLK, TS, DS1, DS2, and RS. An operation for regulating the crossover voltage by the transceiver 220 will be described below.

The USB interface system 200 of the invention is usefully applicable in performing interface operations between digital data processing systems, such as personal computers or serial data buses (e.g., USB) of work stations, and function devices providing various kinds of additional functions to the systems, such as keyboards, mice, joysticks, microphones, and speakers. It uses USBs or FWs for serial buses connecting peripheral devices to personal computers or workstations. Here, the invention is applied to be cooperative with other types of interface system while this embodiment is employed in a USB environment.

The USB transmits signals and power voltages through a four-wire cable. Two wire point-to-point segments carry out the signaling. Signals at each segment are sequentially driven by a cable having intrinsic impedance defined in the USB standard manual V1.1. The USB assists a tri-state operation for bi-directional half duplex mode and has the maximum transmission speed of 12 Mbps.

There are two kinds of operation modes in the USB signaling, i.e., a full-speed (or high-speed) mode with the data rate of 12 Mbps±0.25% and a low-speed mode with the data rate of 1.5 Mbps±1.5%. The two modes are alternatively operable in a single USB system by using a mode switching function. A USB for the low-speed mode is connected through an unshielded and untwisted pair cable having the maximum length of 3 m. In the low-speed mode, a rising time or a falling time of signals on the cable is longer than 75 ns so as to restrain RFI emissions and shorter than 300 ns so as to regulate timing delays and signaling skews and distortions. Also, a low-speed driver provides specific static signals levels having smooth rising and falling slopes.

The USB function devices are classified into two kinds in view of power supply scheme: one is a self-powered device having a power supply unit for itself; the other is a bus-powered device receiving a power of 5V through a cable. Signals are operable in the voltage range of 0~5V in each device while data signals transmitted between each device and the USB cable are operable in the voltage range of −0.5~3.8V. Thus, it is necessary to supply a power voltage of 3.3V at least to each device in order to conduct operations with data signals.

Configurations and operation in the USB low-speed transceiver 220 for regulating a crossover voltage of the bus-specific data signals to be transferred to the USB cable will now be described.

Figure 3:
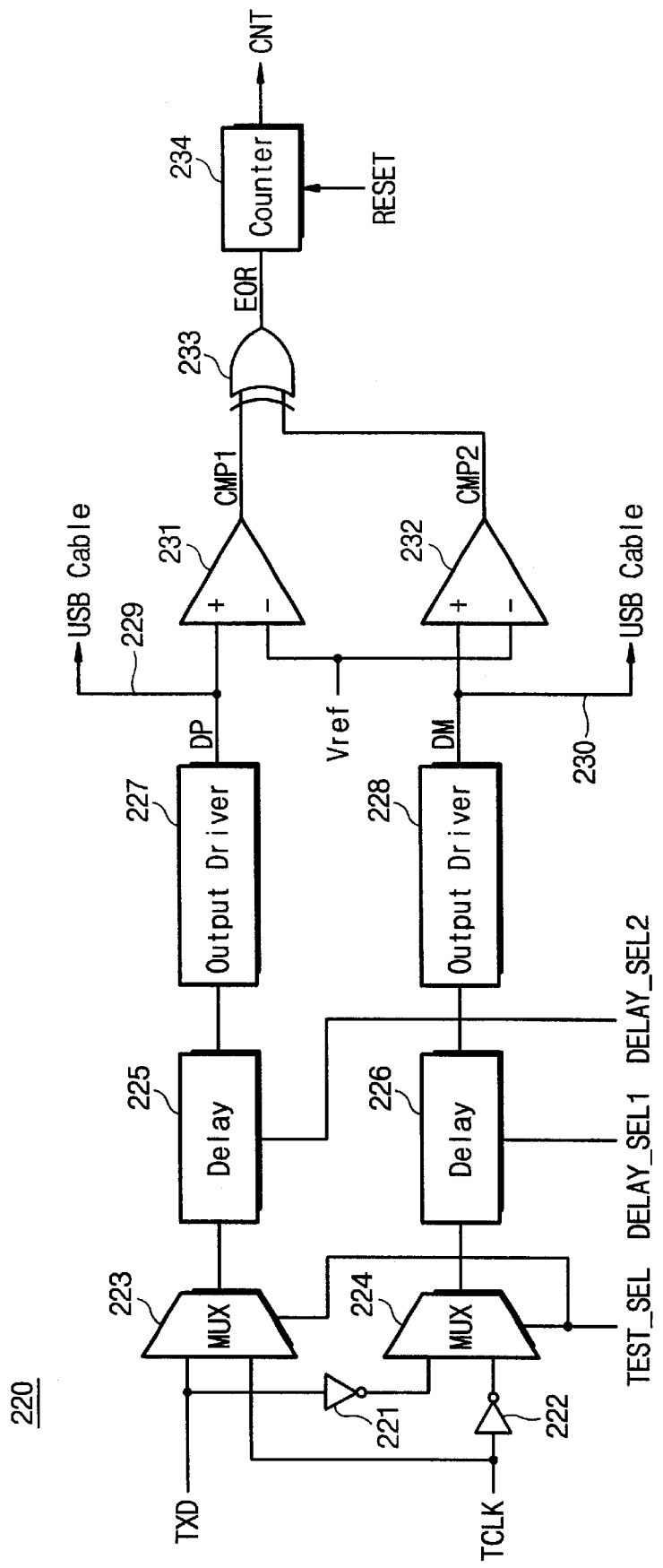
FIG. 3 illustrates a detail structure of a low-speed USB transceiver shown in FIG. 2.

Referring to FIG. 3, the transceiver 220 includes inverters 221 and 223, multiplexers 223 and 224, delay circuits 225 and 226, output drivers 227 and 228, comparators 231 and 232, an exclusive OR gate 233, and a counter 234.

The multiplexer 223 outputs an alternative one of the interface-specific data signal TXD and the test clock signal TCLK in response to the test mode selection signal TS. The inverters 221 and 222 invert logic states of the interface-specific data signal TXD and the test clock signal TCLK.

The delay circuit 225 holds an output of the multiplexer 223 for a predetermined time in response to the first delay selection signal DS1, and the delay circuit 226 holds an output of the multiplexer 224 for a predetermined time in response to the second delay selection signal DS2.

The output driver 227 converts an output signal from the delay circuit 225 into the first bus-specific data signal DP to be transferred into the first data line 229, and the output driver 228 converts an output signal from the delay circuit 226 into the first bus-specific data signal DM to be transferred into the first data line 230. The bus-specific data signals DP and DM generated from the output drivers 227 and 228, respectively, are transferred to the host or the hub through the USB cable 300.

The comparator 231 has a non-inverted input terminal receiving the first bus-specific data signal DP, an inverted input terminal connected to a reference voltage Vref, and an output terminal generating a comparison signal CMP1. The comparator 232 has a non-inverted input terminal receiving the first bus-specific data signal DM, an inverted input terminal connected to the reference voltage Vref, and an output terminal generating a comparison signal CMP2. The reference voltage Vref is positioned within a permissible range for crossover voltage, i.e., 1.3~2.0V, which is defined in the USB standard V1.1. In one embodiment, the reference voltage Vref is set to, for example, 1.65V, which is an intermediate level in the output voltage range 0~3.3V.

The exclusive OR gate 233 carries out an exclusive OR operation on the comparison signals CMP1 and CMP2 provided from the comparators 231 and 232. The counter 234 is initiated by the reset signal RS provided from the USB controller 210 and receives an output signal EOR of the exclusive OR gate 233. Counting values CNT from the counter 234 are applied to the USB controller 210.

Figure 4:
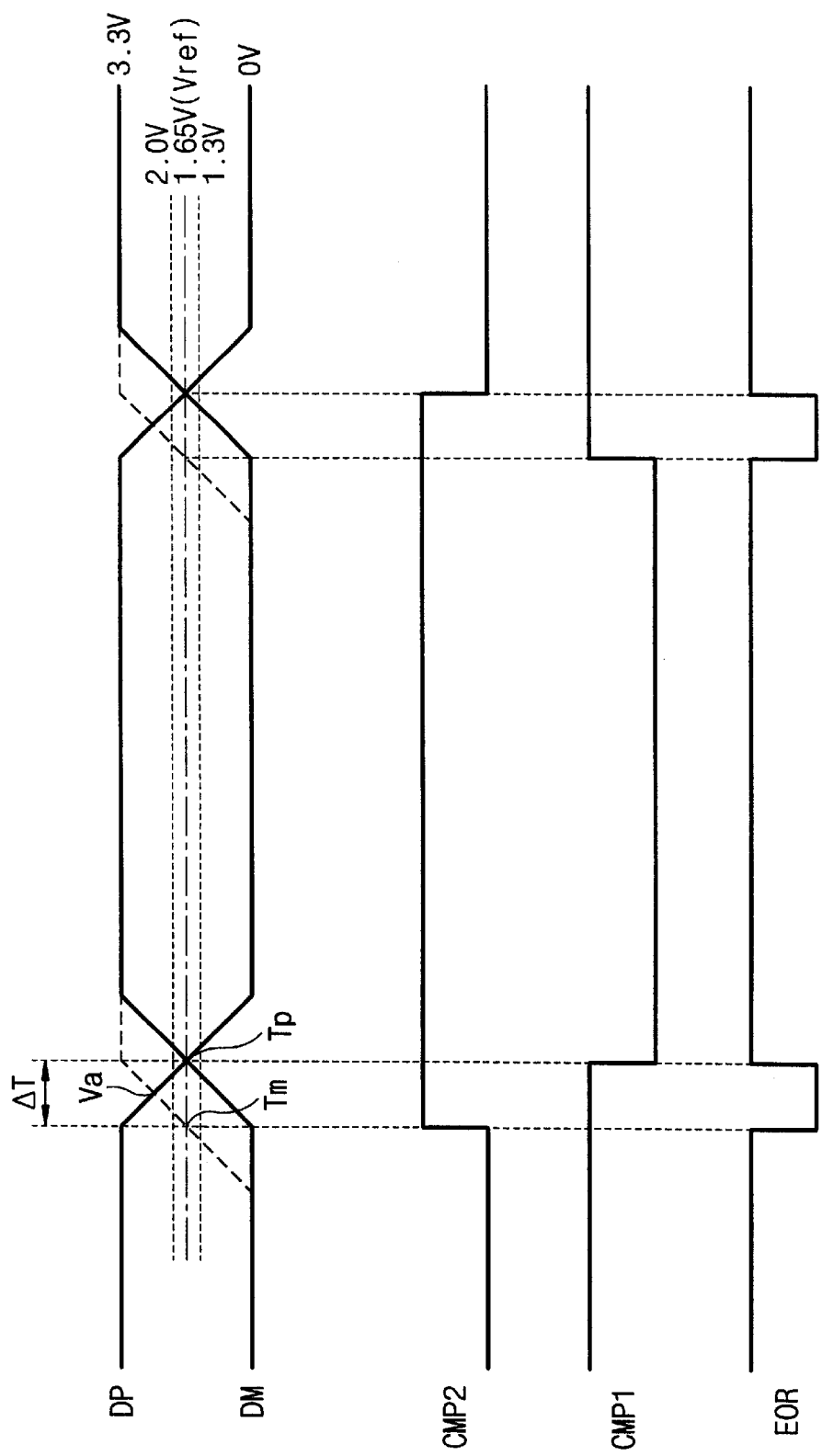
FIG. 4 illustrates voltage waveforms of signals appearing at the elements of the transceiver during an active state.
Figure 5:
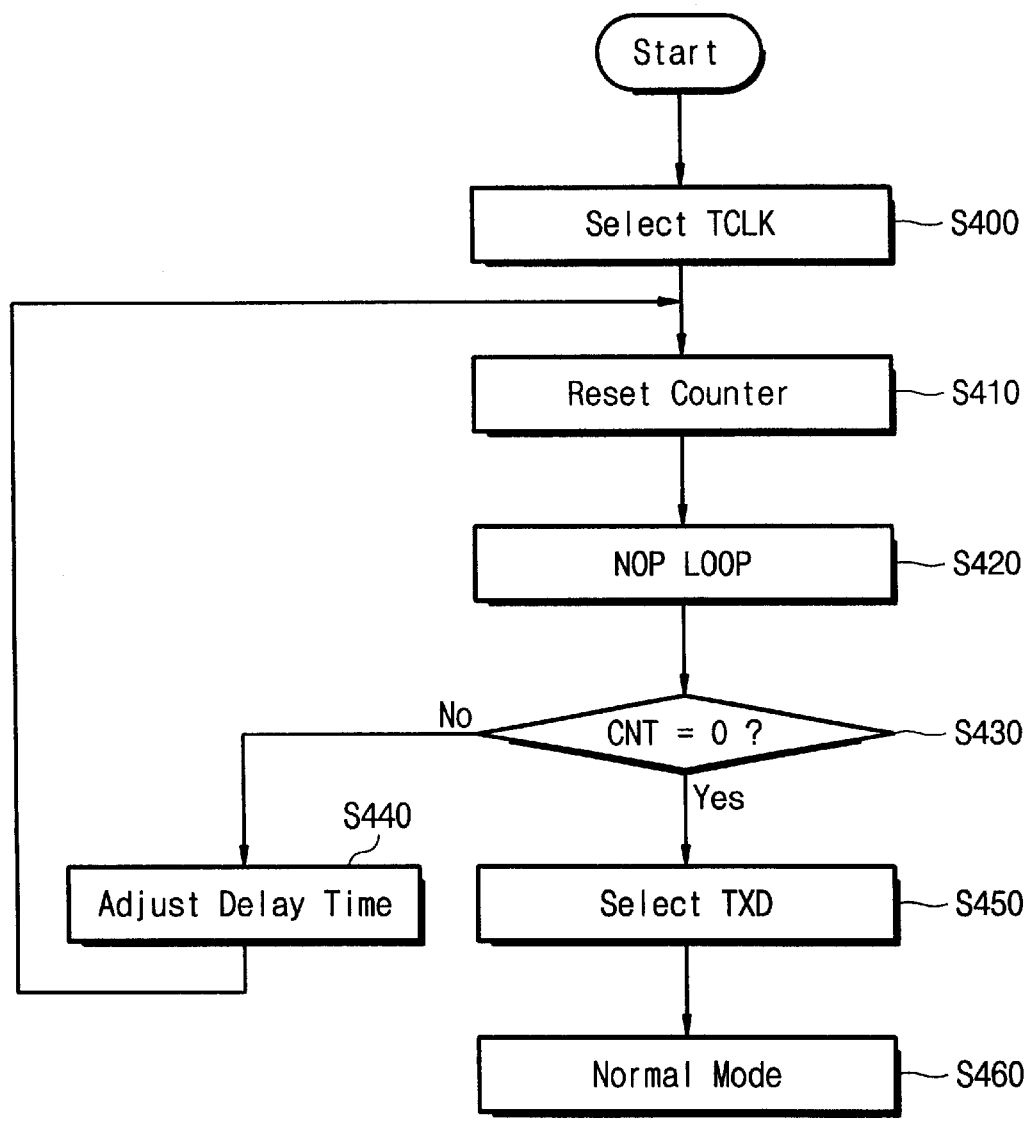
FIG. 5 is a flow chart showing a sequential procedure of a USB controller shown in FIG. 3.

Operation of the transceiver 220 will be described hereinafter with reference to FIGS. 3 through 5. FIG. 4 shows timing features of the signals in the transceiver 220 shown in FIG. 3, and FIG. 5 shows sequential procedures conducted in the USB controller 210. The USB controller 210 is designed to be active whenever a power supply is applied or to be conductive once at the final test step of its manufacturing process.

Referring to FIG. 4, at a step S400, when the USB controller 210 generates the test mode selection signal TS at a high level, the multiplexers 223 and 224 select the test clock signal TCLK. The test clock signal TCLK has a predetermined frequency. The counter 234 is initiated at a step S410 by the reset signal RS at a high level provided from the USB controller 210.

The signals generated from the multiplexers 223 and 224 are converted into the first and second bus-specific data signals, DP and DM, through the delay circuits 225 and 226, and the output drivers 227 and 228, respectively.

The comparators 231 and 232 output the comparison signals CMP1 and CMP2 in accordance with voltage differences between the reference voltage Vref and the bus-specific data signals DP and DM. As shown in FIG. 4, when a crossover voltage Va between the bus-specific data signals DP and DM is positioned out of the permissible range (i.e., 1.3~2.0V) defined in the USB standard V1.1 (Va is over 2.0V due to an early rising of DM), a time deviation ΔT occurs between time points, Tm and Tp, at which DM crosses with Vref and at which DP crosses with Vref. Such a time deviation between the time points on the reference voltage level arises from threshold voltage differences of transistors embedded in the output drivers 227 and 228. As is well known, it is substantially impossible to make threshold voltages of transistors to be on a uniform profile because of variations of processing parameters.

The exclusive OR gate 233 carries out an exclusive logic operation with the comparison signals CMP1 and CMP2 generated from the comparators 231 and 232. The output signal EOR from the exclusive OR gate 233 is established on a low level between the voltage points Tm and Tp at which the bus-specific data signals DM and DP each meet at the reference voltage Vref. The counter 234 is activated in response to the output signal EOR of the exclusive OR gate 233.

Next, during a step S420, the counter 234 is held in a non-operable state (NOP Loop) for a predetermined time although EOR appears there. It is desirable to maintain the NOP state of the counter 234 to be longer than the time between Tm and Tp.

After then, at a step S430, the USB controller 210 checks whether or not the counting value CNT from the counter 234 is "0" (i.e., a low level), which would indicate that there is no difference between Tm and Tp. If CNT is not "0", the delay circuit 225 or 226 activates the delay selection signals DS1 or DS2 at a step 440, in order to adjust the Tm or Tp. For instance, for synchronizing Tm and Tp in the situation shown in FIG. 4, since Tm is earlier than Tp, the second delay circuit 226 can make the second bus-specific data signal DM rise up to a high level after the time difference ΔT from Tm. At this time, the first delay circuit 225 is held in a reset state (an initial state or a fixed state). On the contrary, when Tp is earlier than Tm, the first bus-specific data signal DP falls down to a low level after ΔT from Tp by the first delay circuit 225 while the second delay circuit 226 is in a reset state (an initial state or a fixed state). Adjusting the rising or falling time point of the bus-specific data signal proceeds step by step with gradual rates, so that Tm and Tp become equal within the permissible rage of crossover voltage of the bus-specific data signals DM and DP. A binary search technique can also be employed to regulate the crossover voltage of the bus-specific data signals by controlling operations in the delay circuits 225 and 226. If the counting value CNT is still "0" even after adjusting the delay time for DM or DP once or several times, the feedback loop of S410 through S440 will be repeated until the counting value CNT changes to "1" (i.e., a high level).

Thus, when the time points at which the bus-specific data signals DM and DP reach the reference voltage Vref, Tm and Tp, are identical to each other, the exclusive OR gate 233 generates a high-leveled EOR and thereby the counting value CNT is set on "1". Then, the test mode is over by a low-leveled test mode selection signal TS provided from the USB controller 210, and then a normal mode starts at a step 460 after selecting the transmission data signal (i.e., the interface-specific data signal) TXD at a step S450.

As described above, although a crossover voltage of a pair of bus-specific data signals deviates from a previously permissible voltage range (e.g., 1.3~2.0V) due to a wider threshold distribution profile of transistors embedded in output drivers generating the data signals, the erroneous location of the crossover voltage can be corrected by adjusting the delay times of the data signals. As a result, the transceiver can be operable with stable performances to generate bus-specific data signals adaptable to the USB standard V1.1 and to compensate undesirable obviation of the crossover voltage due to process variations.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A data transmission circuit transferring first and second data signals onto first and second data lines, respectively, the circuit comprising:
   a selection circuit for outputting an external data input signal in a normal mode while outputting an external test clock signal;
   an output circuit for converting an output signal from the selection circuit to the first and second data signals with predetermined delay times; and
   a comparison circuit for determining whether a crossover voltage of the data signals is positioned within a predetermined range;
   wherein the data signals are adjusted with delay times when the crossover voltage deviates from the predetermined range.

2. The data transmission circuit of claim 1, wherein the comparison circuit comprises:
   a first circuit for checking a first time point at which the first data signal reaches a reference voltage;
   a second circuit for checking a second time point at which the second data signal reaches the reference voltage; and
   a third circuit for checking whether the first and second time points match with each other.

3. The data transmission circuit of claim 2, wherein the first circuit is formed of a comparator comprising a non-inverted input terminal receiving the first data signal, an inverted input terminal receiving the reference voltage, and an output terminal generating a first comparison signal indicative of a voltage difference between the first data signal and the reference voltage.

4. The data transmission circuit of claim 2, wherein the second circuit is formed of a comparator comprising a non-inverted input terminal receiving the second data signal, an inverted input terminal receiving the reference voltage, and an output terminal generating a second comparison signal indicative of a voltage difference between the second data signal and the reference voltage.

5. The data transmission circuit of one of claims 3 and 4, wherein the third circuit is formed of a logic circuit performing an exclusive OR operation for the comparison signals.

6. The data transmission circuit of claim 5, further comprising a counter for counting a maintenance time of an active period of an output signal generated from the logic circuit.

7. The data transmission circuit of claim 6, wherein the delay times of the data signals increase in accordance with counting values provided from the counter.

8. The data transmission circuit of claim 1, wherein the data transmission circuit is employed in an electronic device adaptable to USB standard V1.1.

9. The data transmission circuit of claim 8, wherein the data lines are applicable to a USB interface.

10. The data transmission circuit of claim 9, wherein the reference voltage is from 1.3V to 2.0V.

11. A data transmission circuit transferring first and second data signals onto first and second data lines, respectively, the circuit comprising:
    a first selection circuit for outputting an external data input signal in a normal mode while outputting an external test clock signal;
    a second selection circuit for outputting a complementary signal of the external data input signal in a normal mode while outputting a complementary signal of the external test clock signal;
    a first delay circuit for delaying an output signal of the first selection circuit by a predetermined time;
    a second delay circuit for delaying an output signal of the second selection circuit by a predetermined time;
    a first output circuit for converting an output signal of the first delay circuit into the first data signal to be transferred into the first data line;
    a second output circuit for converting an output signal of the second delay circuit into the second data signals to be transferred into the second data line; and
    a comparison circuit for determining whether a crossover voltage of the data signals is positioned within a predetermined range during the test mode;
    wherein the data signals are adjusted with delay times when the crossover voltage deviates from the predetermined range.

12. The data transmission circuit of claim 11, wherein the comparison circuit comprises:
    a first circuit for checking a first time point at which the first data signal reaches a reference voltage;
    a second circuit for checking a second time point at which the second data signal reaches the reference voltage; and
    a third circuit for checking whether the first and second time points match with each other.

13. The data transmission circuit of claim 12, wherein the first circuit is formed of a comparator comprising a non-inverted input terminal receiving the first data signal, an inverted input terminal receiving the reference voltage, and an output terminal generating a first comparison signal indicative of a voltage difference between the first data signal and the reference voltage.

14. The data transmission circuit of claim 12, wherein the second circuit is formed of a comparator comprising a non-inverted input terminal receiving the second data signal, an inverted input terminal receiving the reference voltage, and an output terminal generating a second comparison signal indicative of a voltage difference between the second data signal and the reference voltage.

15. The data transmission circuit of one of claims 13 and 14, wherein the third circuit is formed of a logic circuit performing an exclusive OR operation for the comparison signals.

16. The data transmission circuit of claim 15, further comprising a counter for counting a maintenance time of an active period of an output signal generated from the logic circuit.

17. The data transmission circuit of claim 16, wherein the delay times of the data signals increase in accordance with counting values provided from the counter.

18. A serial interface device used in conducting interface operations between a serial data bus of a digital data processing system and function devices offering additional functions to the system, the serial interface device comprising:

a controller for converting a data signal from the function device into an interface-specific data signal and for generating plural control signals; and a data transmission circuit transferring first and second data signals into first and second data lines respectively, comprising:

a selection circuit for outputting an external data input signal in a normal mode while outputting an external test clock signal;

an output circuit for converting an output signal from the selection circuit to the first and second data signals with predetermined delay times; and a comparison circuit for determining whether a crossover voltage of the data signals is positioned within a predetermined range;

whereby the data signals are adjusted with delay times when the crossover voltage deviates from the predetermined range.

19. The data transmission circuit of claim 18, wherein the comparison circuit comprises:

a first circuit for checking a first time point at which the first data signal reaches a reference voltage;

a second circuit for checking a second time point at which the second data signal reaches the reference voltage; and a third circuit for checking whether the first and second time points match with each other.

20. The data transmission circuit of claim 19, wherein the first circuit is formed of a comparator comprising a non-inverted input terminal receiving the first data signal, an inverted input terminal receiving the reference voltage, and an output terminal generating a first comparison signal indicative of a voltage difference between the first data signal and the reference voltage.

21. The data transmission circuit of claim 19, wherein the second circuit is formed of a comparator comprising a non-inverted input terminal receiving the second data signal, an inverted input terminal receiving the reference voltage, and an output terminal generating a second comparison signal indicative of a voltage difference between the second data signal and the reference voltage.

22. The data transmission circuit of one of claims 20 and 21, wherein the third circuit is formed of a logic circuit performing an exclusive OR operation for the comparison signals.

23. The data transmission circuit of claim 22, further comprising a counter for counting a maintenance time of an active period of an output signal generated from the logic circuit.

24. The data transmission circuit of claim 23, wherein the delay times of the data signals increase in accordance with counting values provided from the counter.

25. The data transmission circuit of claim 18, wherein the data transmission circuit is employed in an electronic device adaptable to USB standard V1.1.

26. The data transmission circuit of claim 25, wherein the data lines are applicable to a USB interface.

27. The data transmission circuit of claim 26, wherein the reference voltage is from 1.3V to 2.0V.

* * * * *